United States Patent [19]

Durmis et al.

[11] Patent Number: 4,500,446
[45] Date of Patent: Feb. 19, 1985

[54] MIXED UNSATURATED MONOCARBOXYLIC ACID ESTERS OF 2,2,6,6-TETRAMETHYL-4-PIPERIDINOL AND OF ITS AMMONIUM CARBOXYLATE AS STABILIZER AGAINST UV IN POLYMERIC MATERIALS

[75] Inventors: Julius Durmis; Alojz Balogh; Milan Karvas; Maria Hrachovcovà; Jan Masek; Pavol Caucik; Marta Povazancovà, all of Bratislava, Czechoslovakia

[73] Assignee: Chemicke zavody Juraja Dimitrova, narodny podnik, Bratislava, Czechoslovakia

[21] Appl. No.: 421,790

[22] Filed: Sep. 23, 1982

[30] Foreign Application Priority Data

Sep. 23, 1981 [CS] Czechoslovakia ............... 7009-81

[51] Int. Cl.$^3$ ............................................. C09K 15/22
[52] U.S. Cl. ..................................... 252/403; 546/242
[58] Field of Search ........................ 252/403; 546/242

[56] References Cited

U.S. PATENT DOCUMENTS

| Re. 31,342 | 9/1983 | Holt et al. | 546/242 X |
| 3,705,166 | 12/1972 | Murayama et al. | 546/242 |
| 3,840,494 | 10/1974 | Murayama et al. | 546/242 X |
| 4,049,647 | 9/1977 | Holt et al. | 524/99 X |
| 4,056,507 | 11/1977 | Ramey et al. | 546/242 X |

*Primary Examiner*—Ben R. Padgett
*Assistant Examiner*—Matthew A. Thexton

[57] ABSTRACT

A stabilization mixture is described for use with polymeric materials, the mixture evidencing high stabilization efficiency against the effect of ultraviolet radiation which being of low toxicity. The mixture comprises from 80–100%, by weight, of a mixture of 2,2,6,6-tetramethyl-4-piperidinol esters and from 0–20%, by weight, of the ammonium carboxylates thereof. The mixture is prepared by heating derivatives of 2,2,6,6-tetramethyl-4-piperidinol with mixtures of stearic, palmitic, heptadecanic, myristic and oleic acids at temperatures ranging from 150–260 degrees C.

3 Claims, No Drawings

MIXED UNSATURATED MONOCARBOXYLIC ACID ESTERS OF 2,2,6,6-TETRAMETHYL-4-PIPERIDINOL AND OF ITS AMMONIUM CARBOXYLATE AS STABILIZER AGAINST UV IN POLYMERIC MATERIALS

This invention relates to a stabilizer for polymers. More particularly, the present invention relates to a stabilizer for polyolefins, styrene polymers and copolymers and polyurethanes which stabilizer comprises a mixture of a piperidinol ester and its ammonium carboxylate.

The first derivatives of esters of monocarboxylic acids with 2,2,6,6-tetramethyl-4-piperidinol were the esters of benzoic and acetic acid described in Chemische Berichte 45, 2060 (1912). These esters and those obtained from other aliphatic monocarboxylic acids with 2,2,6,6-tetramethyl-4-piperidinol were described in British Pat. No. 1,390,252. The application of these esters as stabilizers for polymers against the harmful effect of light and heat was recognized at an early date. Thus, for example, Austrian Pat. No. 320,992 describes the use of 2,2,6,6-tetramethyl-4-piperidinol and 1-alkyl-2,2,6,6-tetramethyl-4-piperidinol derivatives of mono-, di-, tri-, and tetra-carboxylic acids containing aromatic and alicyclic groups for this purpose, and similar compositions are disclosed in West German Pat. No. 2,258,752 and U.S. Pat. No. 3,992,390. The most advantageous method for the preparation of such compounds involves the reesterification of alkylesters of acids derived from low molecular weight alcohols such as methyl, ethyl or propyl esters with the corresponding 2,2,6,6-tetramethyl-4-piperidinol (See British Pat. No. 1,390,252).

Although piperidyl esters of aliphatic monocarboxylic acids having less that 12 carbon atoms in the acid are known, the esters of 2,2,6,6-tetramethyl-4-piperidinol with unsaturated monocarboxylic acids are not described. Additionally, it has been determined that mixtures of esters of aliphatic monocarboxylic acids having from 14 to 18 carbon atoms with 2,2,6,6-tetramethyl-4-piperidinol and, optionally, ammonium salts of aliphatic unsaturated monocarboxylic acids with their 2,2,6,6-tetramethyl-4-piperidyl esters evidence surprising and unexpected properties which compare favorably with the characteristics of the known piperidyl esters and the known stabilizers comprising 2,2,6,6-tetramethyl piperidine.

The known light stabilizers including 2,2,6,6-tetramethyl piperidinol with esters of aliphatic monocarboxylic acids evidence satisfactory light stabilizing effects in polyolefins. However, this effect is sharply reduced as the polymer is exposed to stress at higher processing temperatures or when exposed to liquid extraction agents. It is also known that monomeric 2,2,6,6-tetramethyl piperidine derivatives cannot be used in those cases where the requirement exists for an acute oral toxicity, $LD_{50}$, greater than 10 g/kg of live weight. In addition to the foregoing limitations, the known processes for preparing 2,2,6,6-tetramethyl-4-piperidinol esters (See West German Pat. No. 2,204,659) are most burdensome in that numerous steps are required and even the most advantageous process requires at least one synthetic stage more than is manageable. These prior art techniques are also associated with waste water and by-product removal (hydrogen halogenides, low molecular weight alcohols, catalysts, etc.) as well as a necessity to employ chemically pure compounds.

In accordance with the present invention, these prior art limitations are effectively aliviated by the use of a novel stabilizer mixture. The mixture of interest herein comprises from 80–100%, by weight, of 2,2,6,6-tetramethyl-4-piperidinol esters of the formula

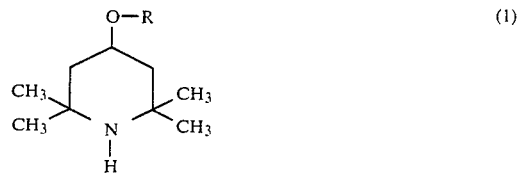

and from 0–20%, by weight, of their ammonium carboxylates of the formula

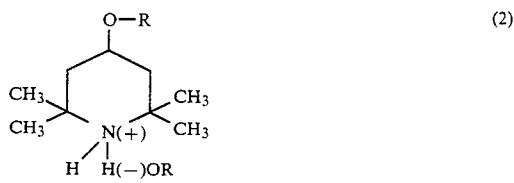

wherein R is an acyl residue derived from a straight or branched chain unsaturated carboxylic acid of 14–18 carbon atoms, or optionally, the R in compound (1) or (2) may comprise (a) 37–70%, by weight, of a compound in which R is a stearoyl, a general preference existing for a range of 44–65%, by weight, (b) 20–52%, by weight, of a compound in which R is palmitoyl, a general preference existing for a range of 31–49%, by weight, (c) 0.2–6.0%, by weight, of a compound in which R is heptadecanoyl, a general preference existing for a range of 0.3–4%, by weight, (d) 0.1–5.0%, by weight, of a compound in which R is myristoyl, a general preference existing for a range of 0.1–2.2%, by weight, and (e) 0.2–6.0%, by weight, of a compound in which R is oleoyl, a general preference existing for a range of 0.3–1.5%, by weight.

In each of the foregoing cases, the individual components form 100% of the mixture.

The procedure employed in preparing the described mixture involves heating 2,2,6,6-tetramethyl piperidinol of the formula

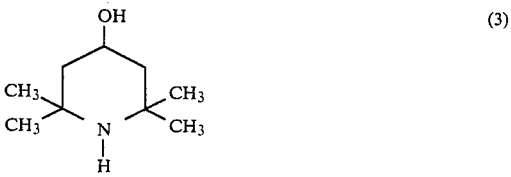

with a mixture of monocarboxylic acids of the formula

wherein R is as defined above, at a temperature ranging from 150–260 degrees C. while distilling off reaction water gradually, a general preferance existing for a temperature within the range of 180-240 degrees C.

Typically, the source of the monocarboxylic acids is a mixture known in the art as "Stearin" which comprises (a) 37-70%, by weight, stearic acid and preferably from 44-65%, by weight, (b) 29-52%, by weight, palmitic acid and preferably from 31-49%, by weight, (c) 0.2-6.0%, by weight, heptadecanic acid and preferably 0.3-4.0% by weight, and (d) 0.1-5.0%, by weight, myristic acid and preferably from 1.0-2.2%, by weight, and (e) 0.2-6.0%, by weight, oleic acid and preferably 0.3-1.5%, by weight.

This mixture of acids is prepared by the splitting of natural fats and may also contain higher molecular weight unsaturated carboxylic acids dependent upon the type of fats employed for splitting.

In the operation of the process molar excesses of the acidic and basic components may be employed. However, it is most advantageous to employ equimolar amounts. Reaction is continued for about 10 hours and the resultant product may be purified by known techniques such as crystallization or distillation. As a result of the foregoing, there is obtained a mixture of 2,2,6,6-tetramethyl-4-piperidinol esters with monocarboxylic acids of the aforementioned composition and ammonium carboxylates of the esters, the composition being dependent on the composition of the acids employed and the molar ratio of acids to 2,2,6,6-tetramethyl-4-piperidinol. The product is typically obtained in yields greater than 90% of theoretical and oftimes as high as 99% of theoretical yield.

Esters of formula (1) may be conveniently isolated from the resultant mixture by means of an organic solvent such as hexane and it may be quantitatively obtained by subsequent filtration and evaporation of solvent from the filtrate while the compound of formula (2) is separated in a pure state in the form of a filter cake. Compounds of formula (1) may also be separated from the mixture by crystallization.

The stabilization mixture described herein is preferably used for enhancement of the resistance against the effect of light on atmospheric influences upon polymeric materials which are subject to degradation such as high and low density polyethylene, polypropylene, styrene polymers and copolymers and polyurethanes.

The stabilizers described herein evidence the advantageous properties of the most effective photostabilizers known heretofore, namely, those based upon 2,2,6,6-tetramethyl-4-piperidinol, as well as high light-stabilizing efficiency in polyolefins. This efficiency may be varied after preliminary thermal stress of the polymer. It has been noted that the efficiency of the stabilizer mixture is suppressed after extraction with liquids such as water with or without a detergent. However, this suppression has been found to be less than clear which results when utilizing conventional stabilizers based upon 2,2,6,6-tetramethyl-4-piperidinol. Lastly, the described stabilizers evidence low oral toxicity, the $LD_{50}$ being higher than 10 g/kg of live weight. These characteristics permit the use of these stabilizers under the extreme conditions imposed on polymeric substrates such as polypropylene fibers.

The process described for the preparation of the novel stabilizers has also been found to be highly advantageous. Thus, for example, its simplicity provided by direct esterification is highly advantageous as well as the fact that preliminary purification of compounds is not required prior to their entering reaction. And lastly, by-product removal and waste water liquidation are not problems.

Several examples of the practice of the present invention are set forth below. It will be appreciated by those skilled in the art that these examples are solely intended to be for purposes of exposition and are not to be construed as limiting.

EXAMPLE 1

962.8 g (6.12. moles) of 2,2,6,6-tetramethyl-4-piperidinol and 1587 g (5.79 moles) of a mixture of aliphatic monocarboxylic acid composed of 60% by weight of stearic acid, 38% by weight of palmitic acid and 0.3% by weight of heptadecanic acid, 1.3% by weight of mysteric acid, and 0.4% by weight of oleic acid were inserted into 3 liter reaction flask equipped with an azeotropic adapter for distillation of reaction water. The mixture was heated on an oil bath to a temperature within the range of 180 to 200 degrees C. for 10 hours. Reaction water simultaneously distilled through the azeotropic adapter. The reaction was terminated after 10 hours. The crude reaction mixture (99% of theoretical) was recrystallized from petroleum ether to yield a white crystalline compound melting at 30 to 58 degrees C. Using infra-red spectroscopy, determination of the acid number and nuclear magnetic resonance spectroscopy it was found that the product was a mixture of 90.2% of esters of the above-mentioned fatty acids and 2,2,6,6-tetramethyl-4-piperidinol of formula (1) with 9.8% of salts of the above-mentioned acids with esters thereof with 2,2,6,6-tetramethyl-4-piperidinol (formula 2).

EXAMPLE 2

A product having melting point of 29 to 45 degrees C. and containing 4.5% of salt and 95.5% of esters was prepared by the same process as in Example 1 from 78.37 g (0.28 moles) of a mixture containing 44% by weight of stearic acid, 49% by weight of palmitic acid, 4.8% by weight of heptadecanic acid, 1.9% by weight of myristic acid and 0.3% by weight of oleic acid, and from 45 g (0.28 moles) of 2,2,6,6-tetramethyl-4-piperidinol. The yield was 96.0% of theoretical.

EXAMPLE 3

45 g (0.28 moles) of 2,2,6,6-tetramethyl-4-piperidinol and 86.2 g (0.31 moles) of a mixture of aliphatic monocarboxylic acids composed of 65% by weight of stearic acid, 31% by weight of palmitic acid and 0.3% by weight of heptadecanic acid, 2.2% by weight of myristic acid and of 1.5% by weight of oleic acid were inserted into a 250 ml. reaction flask equipped with an azeotropic adapter for distillation reaction water. The reaction mixture was heated on an oil bath at a temperature of 200 to 240 degrees C. for 10 hours. The water distilled off was collected in the azeotropic adapter. 5.2 ml of water distilled off after 10 hours. The resultant product was subjected to analysis after cooling. It contained 80.2% by weight of esters of the above-mentioned acids and 19.8% by weight of salts of these acids with their esters. The yield was 98% of theoretical. The product was subjected to vacuum distillation at 190 to 220 degrees C. A white compound was obtained having a melting point of 29 to 45 degrees C. (133 Pa).

EXAMPLE 4

A crude product was prepared by the same process as in Example 1. The reaction mixture was dissolved in acetone after cooling, the formed suspension filtered off and colature was evaporated to dryness. The total solids were distilled under vacuum at 190 to 225 degrees C. (133 Pa). A mixture of 2,2,6,6-tetramethyl-4-piperidinol esters was obtained with the following composition: 59.27% by weight of 2,2,6,6-tetramethyl-4-piperidinyl stearate, 35.48% by weight of 2,2,6,6-tetramethyl-4-piperidinyl palmitate, traces of 2,2,6,6-tetramethyl-4-piperidinyl heptadecanate, 2.51% by weight of 2,2,6,6-tetramethyl-4-piperidinyl myristate and 1.7% by weight of 2,2,6,6-tetramethyl-4-piperidinyl oleate (gas chromatography).

EXAMPLE 5

0.1% by weight of 3,5-di,tert-butyl-4-hydroxyphenyl-octadecyl propionate and 0.15% by weight of calcium stearate were mixed into a non-stabilized powdered polypropylene having an isotacticity index of 96.64 and a flow index of 8.58 g/10 minutes at 230 degrees C. Two samples were made from the prepared mixture. 2-hydroxy-4-octyloxy-benzophenone in an amount of 0.3% by weight was added as a light stabilizer to one of the samples for comparison. A mixture of esters of 2,2,6,6-tetramethyl-4-piperidinol and their salts prepared according to the Example 1 was added to the other sample in the same amount.

Each of the samples was further homogenized in a mixing chamber of plastograph "Brabender" at a temperature of 190 degrees C. in a nitrogen atmosphere for 5 minutes. Foils of 0.5 mm roughness were prepared from homogenized polymer, from which foil testing bodies were made. One group of bodies was washed in water at a temperature of 50 degrees C. for 24 hours, the water containing 4 g/l of detergent. This group together with the group of non-washed bodies was subjected to tests for accelerated ageing in Xenotest 450 at a temperature of 45 degrees C., a relative humidity of 65% and while spraying. The whole cycle composed of a dry stage, 10 minutes of spraying and a stage with a frame rotation lasted 170 minutes.

Changes in ageing were evaluated by tracing the increment of carbonyl groups, determined on the basis of absorbability development using an infra-red spectrophotometric method at a wavelength of 1720 $cm^{-1}$.

The results obtained by exposure of samples with various light stabilizers are presented in Table 1 wherein the efficacy of the stabilizer is expressed as durability, the time in hours necessary for obtaining A=0.3, A being the difference in absorbability at a wavelength of 1720 $cm^{-1}$ between the original sample and a sample subjected to the above-described tests.

TABLE 1

| Sample Designation | Light Stabilizer | Durability (in hrs.) A | B |
|---|---|---|---|
| 1 | 2-hydroxy-4-octyloxy-benzophenone | 2020 | 1860 |
| 2 | Bis/2,2,6,6-tetramethyl-4-piperidyl/sebacat | 7100 | 3500 |
| 3 | a mixture of esters of 2,2,6,6-tetramethyl-4-piperidinol and their salts according to the Example 1 | 7800 | 7800 |

TABLE 1-continued

| Sample Designation | Light Stabilizer | Durability (in hrs.) A | B |
|---|---|---|---|

Note:
A - non-washed samples
B - samples washed at temperature 50 degrees C.

EXAMPLE 6

Mixtures with additives were prepared in a laboratory high-speed stirrer from the polymer of Example 5. A mixture of 0.1% by weight of 2,6-di,tert-butyl-4-methyl-phenol, 0.2% by weight of tris-(2,4-di,tert-butylphenyl)phosphite and 0.15% by weight of calcium stearate was used as a basic system. 0.3% by weight of 2-hydroxy-4-octyl-oxybenzophenone or 2,2,6,6-tetramethyl-4-piperidinol esters of Example 3 or of bis(2,2,6,6-tetramethyl-4-piperidinyl)sebacate were always added to the antioxidants in the individual samples. Homogenized samples were subjected to repeated extrusion through a laboratory extruder (D=26 mm, L=20D) and foils having a roughness of 0.5 mm were pressed from the granulate obtained after separate passages (temperature 260 degrees C., pressing time 10 minutes) from which foils testing bodies were prepared. These were exposed in Xenotest 450 under the conditions described in Example 5. Results expressed as durability in hours are presented in Table 2.

TABLE 2

| Sample Designation | Light Stabilizer | Durability (in hrs.) after one passage | after 15 passages |
|---|---|---|---|
| 1 | 2-hydroxy-4-octyl-oxybenzophenone | 1850 | 1720 |
| 2 | bis-/2,2,6,6-tetramethyl-4-piperidinyl/sebacate | 8800 | 7900 |
| 3 | a mixture of esters of 2,2,6,6-tetramethyl-piperidinol and their salts according to the Example 3 | 9700 | 9900 |

EXAMPLE 7

0.1% by weight of 2,6-di,tert-butyl-4-methyl phenol and 0.15% by weight of calcium stearate as a basic stabilization system were mixed into the polymer of Example 5. 0.25% by weight of the light stabilizers set forth in Table 3, below, was added to the individual samples. The samples were then homogenized and test samples prepared from them by the process described in Example 5 which samples were washed with 4 g/l of detergent, in two groups. One group of samples was washed at a temperature of 90 degrees C. for 50 hours. The second group was washed at 50 degrees C. for 24 hours. After washing the samples were aged in Xenotest 450 under the conditions described in Example 5 and after 1500 hours they were subjected to spectrophotometric evaluation to determine the increment of carbonyl group. The results are set forth in Table 3 as differences in absorbability before and after ageing.

TABLE 3

| Sample Designation | Light Stabilizer | Δ A A | B |
|---|---|---|---|
| 1 | 2-hydroxy-octyl-oxybenzophenone | 0.276 | 0.973 |
| 2 | polymeric stabilizer on the | 0.052 | 0.101 |

TABLE 3-continued

| Sample Designation | Light Stabilizer | ΔA A | ΔA B |
|---|---|---|---|
| 3 | basis of piperidine 2,2,6,6-tetramethyl-4-piperidinyl-octoat | 0.048 | 0.120 |
| 4 | a mixture of esters of 2,2,6,6-tetramethyl-4-piperidinol and their salts according to the Example 1 | 0.036 | 0.044 |

Note:
A-samples washed for 24 hours at temperature 50 degrees C.
B-samples washed for 50 hours at temperature 90 degrees C.

EXAMPLE 8

Samples prepared and stabilized by the process described in Example 7 were subjected to thermal stress in an air-heat drier in two series. One part was subjected to thermal stress at a temperature of 120 degrees C. for 120 minutes and the second was stressed at 140 degrees C. for 30 minutes. The samples were then subjected to ageing in Xenotest and to spectrophotometric evaluation of the development of CO groups as in the foregoing Examples. The results are set forth in Table 4, below.

TABLE 4

| Sample Designation | Light Stabilizer | ΔA after 1278 hours in Xenotest 120° C. | 140° C. |
|---|---|---|---|
| 1 | 2-hydroxy-4-octyl-oxybenzo phenone | 0.319 | 0.341 |
| 2 | polymeric stabilizer on the basis of piperidine | 0.022 | 0.101 |
| 3 | bis/2,2,6,6-tetramethyl-4-piperidinyl/sebacat | 0.020 | 0.098 |
| 4 | a mixture of esters of 2,2,6,6-tetramethyl-4-piperidinol and their salts according to Example 3 | 0.012 | 0.014 |

EXAMPLE 9

Mixtures of polymer with the antioxidant described in Example 5 were subjected to plasticization in a plasticating chamber of the plastograph "Brabender" at a temperature of 190 degrees and 250 degrees C. for 10 minutes. Following, stress foils were prepared by the process described in Example 5 and evaluated in Xenotest 450 by the same method. The results are set forth in Table 5 as the difference of absorbability.

TABLE 5

| Sample Designation | Ultraviolet Stabilizer | ΔA after 2000 hours A | B | ΔA after 5000 hours A | B |
|---|---|---|---|---|---|
| 1 | 2-hydroxy-4-octyloxy-benzophenone | 0.089 | 0.216 | degradation | |
| 2 | bis/2,2,6,6-tetramethyl-4-piperidinyl/sebacat | 0.044 | 0.099 | 0.287 | 0.291 |
| 3 | a mixture of 2,2,6,6-tetramethyl-4-piperidinol esters according to Example 4 | 0.101 | 0.012 | 0.216 | 0.194 |

Note:
A - samples stressed on "Brabender" at 190 degrees C.
B - samples stressed on "Brabender" at 250 degrees C.

EXAMPLE 10

Mixtures with stabilizers were prepared from non-stabilized powdered low-density polyethylene with a melt flow index of 2.35 g (10 minutes) at a temperature of 190 degrees C. The samples contained a combination of antioxidants: 0.1% by weight of 2,6-di,tert-butyl-4-methyl phenol, 0.1% by weight of tris-2(2,4-di,tert-butyl-phenyl)phosphite. A second sample also contained an admixture of light stabilizer in an amount of 0.3% by weight. After homogenization in a laboratory mixer the samples were subjected to 15 passages through an extruding extruder (D=26, L=20) at temperatures of 115, 180 and 170 degrees C. Samples were pressed from the material after the first and fifteenth passage at a temperature of 160 degrees C. for 10 minutes. Then the samples were exposed to ageing in Xenotest under conditions described in Example 5. During ageing, the increment of CO groups was evaluated using infra-red spectroscopy. The results obtained as the time in hours necessary for reaching ΔA=0.15 are shown in Table 6.

TABLE 6

| Sample Designation | Light Stabilizer | Time of absorption necessary for reaching ΔA = 0.15 after 1st passage | after 15th passage |
|---|---|---|---|
| 1 | — | 1150 | 1060 |
| 2 | bis/2,2,6,6-tetramethyl-4-piperidinyl/sebacate | 2500 | 2400 |
| 3. | a mixture of esters of 2,2,6,6-tetramethyl-4-piperidinol according to Example 4 | 3500 | 3500 |

The results set forth in Examples 5–8 demonstrate that the stabilizers described herein evidence by several times a higher efficiency of stabilization than that attained with the most commonly employed prior art light stabilizers from the group of substituted benzophenones, and other types of stabilizers from the sterically hindered amines.

EXAMPLE 11

0.5%, by weight of light stabilizers were added to an ABS polymer, designated as Forsam. Foils having a roughness of 0.1 mm were then prepared from the polymer and irradiated with a 400 watt mercury having a Pyrex filter. The induction period corresponded with the unit absorption uptake (A 1745) A 1940-IR spectroscopy. The results are set forth in Table 7, below.

TABLE 7

| Sample Designation | Light Stabilizer | τ (Hours) |
|---|---|---|
| 1 | 2-(2-hydroxy-5-methylphenyl)benztriazol | 56 |
| 2 | bis/2,2,6,6-tetrametyl-4-piperidyl/sebacat | 88 |
| 3 | polymeric type on basis 2,2,6,6-tetra-methyl-4-piperidinol | 76 |
| 4 | a mixture of esters 2,2,6,6-tetramethyl-4-piperidinol by Example 4 | 92 |
| 5 | (without light stabilizer) | 29 |

Studies have revealed that a high stabilization efficiency is maintained by systems employing the described stabilizers after washing with warm water with detergents and after thermal stress. In comparison it has been found that those systems containing the well-

We claim:

1. Stabilization mixture for polyolefins, styrene polymers and copolymers and polyurethanes comprising
   (a) from 80-100%, by weight, of a mixture of 2,2,6,6-tetramethyl-4-piperidinol esters of the formula

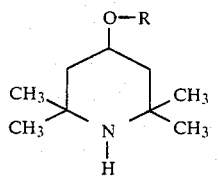

wherein R is an acyl residue derived from a straight or branched chain unsaturated monocarboxylic acid of 14-18 carbon atoms and
   (b) from 0-20%, by weight, of ammonium carboxylates of the formula

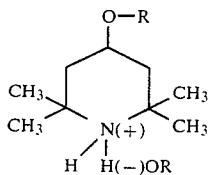

wherein R is as defined above.

2. Stabilization mixture in accordance with claim 1, wherein R may further comprise
   (a) from 37-70%, by weight, of a stearoyl group,
   (b) from 20-52%, by weight, of a palmitoyl group,
   (c) from 0.2-6.0%, by weight, of a heptadecanyl group,
   (d) from 0.1-5.0%, by weight, of a myristoyl group,
   (e) from 0.2-6.0%, by weight, of a oleoyl group, the total amount comprising 100%.

3. Mixture in accordance with claim 2, wherein R is
   (a) from 44-65%, by weight, of stearoyl,
   (b) from 31-49%, by weight, of palmitoyl,
   (c) from 0.3-4.0%, by weight, of heptadecanoyl,
   (d) from 0.1-2.2%, by weight, of myristoyl, and
   (e) from 0.3-1.5%, by weight, of oleoyl the total amount comprising 100%.

* * * * *